United States Patent Office 3,320,251
Patented May 16, 1967

3,320,251
PROCESS FOR PREPARING AMINOPHOSPHINES
Ludwig Maier, Zurich, Switzerland, assignor to Monsanto Company, St. Louis, Mo., a corporation of Delaware
No Drawing. Filed June 1, 1964, Ser. No. 371,735
Claims priority, application Switzerland, June 7, 1963, 7,071/63
7 Claims. (Cl. 260—246)

The present invention is related to a process for preparing aminophosphines having the general formula $(R_2N)_nPR'_{3-n}$. In this formula $R_2N$ is a radical derived from any secondary amine. There can be present one or two such radicals; therefore $n$ is an integer of 1 or 2. R' is an alkyl, cycloalkyl, or aralkyl, optionally containing an olefinic bond, or an aryl. R and R' each will normally have not more than 18 carbon atoms, preferably not more than 8 carbon atoms. Quite generally speaking, R' means a hydrocarbon radical as occurring directly attached to aluminum, since it will be introduced into the phosphorus compound by means of an organoaluminum compound, as will be shown below.

The above formulated compounds have been prepared up to now either by (a) aminolysis of organodichlorophosphines [R''PCl$_2$], or diorganochlorophosphine [R''$_2$PCl] resp. or by
(b) reaction of an aminodichlorophosphine [R$_2$NPCl$_2$] with a Grignard agent or a lithium hydrocarbyl.

In the first method (a) the corresponding organic phosphine halides have to be prepared at first, which is achieved by reacting elemental phosphorus with hydrocarbon halides, or phosphorus trihalides with organometallic compounds, such as tetraalkyl lead, trialkyl aluminum, dialkyl aluminum chloride, alkyl aluminum dichloride, alkyl magnesium chloride, etc. In spite of different proportions of the reactants and different degrees of alkylation of the organometallic compounds possibly used, mixtures of all three of the possible organophosphine compounds, namely alkyldichlorophosphines

[RPCl$_2$]

dialkylchlorophosphines [R$_2$PCl] and trialkylphosphines [R$_3$P], were obtained simultaneously. Because of this nonuniformity of the endproducts, obviously, dialkylaluminum chlorides have not been used at all up to now. From the pertinent literature it is evident that dialkylchlorophosphines are especially difficult to obtain by using the cited methods.

In the second well-known method (b) for preparing aminophosphines, i.e. from aminodichlorophosphines and Grignard reagents, hardly more than 50% yield can be obtained, by reasons elucidated below (A. B. Burg and P. J. Slota, Jr., J. Amer. Chem. Soc. 1958, p. 1107; U.S. Patent 2,934,564).

The present invention discloses a novel process allowing, as desired, the manufacture of monoaminodiorganophosphines as well as diaminoorganophosphines in good yields. The process is based upon the reaction of aminodihalophosphines or diaminohalophosphines with an organoaluminum compound.

The amino-halogen-compounds suitable here correspond to the general formula $(R_2N)_nPX_{3-n}$, wherein $R_2N$ and $n$ are defined as before and X represents a halogen atom. The group $R_2N$ can be derived from any secondary amine, such as dimethylamine, diethylamine, methyl-ethylamine, di-n-propylamine, di-iso-propylamine, di-n-butylamine, di - iso - butylamine, di-tert-butylamine, propyl-dodecylamine, didodecylamine, N - methyl - cyclohexylamine, dicyclohexylamine, ethyl-aniline, pyrrolidine, piperidine, morpholine, etc. In the cases where the endproducts of the present process are to be used as intermediates for further reaction, however, the radicals of the simplest kind of cheaper aliphatic amines are preferred and other amines only are considered if through them the separation by distillation or crystallization of the products obtained in a further reaction would be facilitated.

The organoaluminum compounds serving as second reactants correspond to the general formula $R'_mAlX_{3-m}$, wherein the symbols R' and X are as defined hereinabove, and $m$ is an integer 1, 2 or 3.

As organic substituents it is a case of all hydrocarbon radicals attached to aluminum through a carbon atom, which radicals can be exchanged in the reaction with an aminodihalophosphine for a halogen attached to phosphorus. Examples are methyl, ethyl, n-propyl, n-butyl, isobutyl, tert-butyl, pentyl, hexyl, octyl, 2-ethylhexyl, 2,4,4-trimethylpentyl, decyl, dodecyl, hexadecyl, octadecyl, benzyl, phenylethyl, phenyl, naphthyl, etc., as well as possible analogs that contain the ethylenic linkage.

It is clear that for the present process such organic aluminum compounds are of special practical interest which can be prepared not only by the detour of the Grignard compounds, but also by a direct synthesis, e.g. from olefins, hydrogen and aluminum (in the presence of a catalytic amount of preformed trialkylaluminum). Trimethyl- and triethylaluminum can also be obtained by dehalogenation of the corresponding dialkyl halides by means of sodium, by distillation of the complex compounds formed from dimethyl- or diethylaluminum chloride and sodium chloride, or from dimethyl- or diethylaluminum fluoride and sodium fluoride, respectively. Triethylaluminum is further obtainable from diethylaluminum chloride by the action of sodium hydride and ethylene. As a representative of an unsaturated reaction component, tributenylaluminum, for example, has been described in the literature.

It is a further advantage of this process that organic mono- and di-substituted aluminum halides or mixtures thereof are also usable. The simplest representatives of these classes, namely methyl- and ethylaluminum halides, can be obtained from the corresponding alkyl halides and aluminum or their alloys with magnesium or copper. Methylaluminum dichloride is also expediently prepared from dimethyl ether, aluminum chloride and aluminum. Arylated aluminum compounds can be obtained by heating aryl halides such as chlorobenzene, bromobenzene, iodobenzene, 1 - chloronaphthaline, 2 - chloronaphthaline, chlorodiphenyls, etc. with finely comminuted aluminum powder which has been activated with small amounts of a halogen, of a hydrogen halide, of a metal halide or of a non-metal halide. In many cases, the organoaluminum compounds can be directly converted further without isolation.

It was found that the halogen atom, or atoms respectively, of aminohalophosphines can be exchanged smoothly in the action of an organoaluminum compound for the hydrocarbon radicals, without the amino group being essentially attacked.

The course of this reaction, not customary until now, was thus also unexpected, because in a corresponding alkylation by means of a Grignard reagent, the N-P bond is attacked almost as strongly as the P-Cl bond. Contrary to formerly customary method, also diaminohalophosphines can be now converted into the corresponding hydrocarbon derivatives by means of organoaluminum compounds.

The reaction of the dimethylaminodichlorophosphine with the three possible butylaluminum compounds, can, for example, be illustrated as follows:

$$3Me_2NPCl_2 + 2Bu_3Al \rightarrow 3Me_2NPBu_2 + 2AlCl_3$$
$$Me_2NPCl_2 + Bu_2AlCl \rightarrow Me_2NPBu_2 + AlCl_3$$
$$Me_2NPCl_2 + 2BuAlCl_2 \rightarrow Me_2NPBu_2 + 2AlCl_3$$

(Me=methyl, Bu=n-butyl).

The reaction of, e.g. bis(dimethylamino)chlorophosphine, or of any other aminochlorophosphine proceeds in the same manner.

In the practical procedure, the reactants are mixed in the required proportion. The reaction takes place quickly and the course is generally exothermic. Usually when using monoalkylaluminumdihalide reactants it is preferred to carry out the reaction at somewhat elevated temperatures to drive the reaction to completion with high yields, and normally temperatures of up to 150° C. will be sufficient. Solvents such as hexane, inert to the reaction components, can be used. Moisture and oxygen are excluded from the reaction mixture by protective gases such as nitrogen, argon, etc. Carbon dioxide can be also used with organoaluminum halides for this purpose. After addition of a known complex builder for the aluminum halide, the aminophosphines formed can be distilled off in most cases. The aminophosphines obtainable according to the novel process can also be called phosphinous amides [R'$_2$PNR$_2$], or phosphonous amides [R'P(NR$_2$)$_2$]. The phosphinous amides which have been known up to now and of which the two organic radicals attached to the phosphorus are methyl, trifluoromethyl, methyl and ethyl, ethyl, butyl, phenyl, toluyl, or 1-naphthyl, have been prepared according to one of the methods (a) or (b) mentioned above.

When halogen is mentioned in this description there are to be understood under this term primarily the technically more important chlorides. However, bromides, iodides, and fluorides can be treated in the same way.

The aminophosphines prepared by the process of the invention have a wide variety of uses, such as pesticides, intermediates, etc., as set forth in copending application Ser. No. 50,843, filed Aug. 22, 1960, now U.S. 3,137,692. They are also useful as intermediates for the preparation of well-known insecticidal intermediates dialkylphosphine halides, as described in copending application Ser. No. 365,510, filed May 6, 1964.

*Example 1*

To 44 g. of (CH$_3$)$_2$NPCl$_2$ (0.3 mole) is slowly added in a nitrogen atmosphere a solution of 25 g. of Al(C$_2$H$_5$)$_3$ (0.2 mole) in 150 ml. of hexane. A strong exothermic reaction ensues and a precipitate is formed. After refluxing for 1½ hours the hexane is distilled off. Upon addition of 23 g. of KCl the residue is distilled under reduced pressure. Yield 28 g. (69.4%) (CH$_3$)$_2$NP(C$_2$H$_5$)$_2$. The product which has been purified by a second distillation possesses a boiling point of 141–143°/716 mm.; $n_D^{20}$ 1.4550; $d_4^{20}$ 0.8277.

*Analysis.*—(133.17) C$_6$H$_{16}$NP$_4$: Calc'd percent, C, 54.11; H, 12.11; N, 10.51. Found percent, C, 53.96; H, 11.76; N, 10.32.

*Example 2*

To 46.2 g. of [(CH$_3$)$_2$N]$_2$PCl is slowly added in a nitrogen atmosphere a solution of 7.2 g. of Al(CH$_3$)$_3$ in 100 ml. of hexane. A strong exothermic reaction ensues and a precipitate is formed. After refluxing for 1½ hours the hexane is distilled off. Upon addition of 11 g. of KCl the residue is distilled under reduced pressure. The product is [(CH$_3$)$_2$N]$_2$PCH$_3$. The product which is purified by a second distillation possesses a boiling point of 139–140°/620 mm.; $n_D^{20}$ 1.4630.

*Example 3*

To 64.5 g. (0.44 mole) of (CH$_3$)$_2$NPCl$_2$ is slowly added under an atmosphere of nitrogen 22.5 g. (0.31 mole) of Al(CH$_3$)$_3$ in 100 ml. hexane. During the addition the reaction mixture is cooled with ice, since the reaction is strongly exothermic. Two layers are formed whereby the lower layer is orange colored. After 1½ hour reflux, hexane is distilled off and after addition of 35 g. KCl to the residue, distillation is continued under reduced pressure. The distillate which was collected in a cooling trap, yields on fractional distillation (1) 24–90°/720 mm. Hg—0.7 g. forerun
(2) 96–100°/720 mm. Hg—22.9 g. (=49.5%) (CH$_3$)$_2$PN(CH$_3$)$_2$

*Analysis.*—C$_4$H$_{12}$NP (10.513): Calc'd percent, C, 45.70; H, 11.51; N, 13.33. Found percent, C, 44.37; H, 9.38; N, 14.31.

*Example 4*

(C$_2$H$_5$)P[N(CH$_3$)$_2$]$_2$: From 34 g. (0.22 mole) [(CH$_3$)$_2$N]$_2$PCl, 8.4 g. (0.074 mole) AlEt$_3$, 75 ml. hexane and 20 g. KCl as described in Example 3. Distillation of the crude distillate (16 g.) gives 14.5 g. (44.6%) of C$_2$H$_5$P[N(CH$_3$)$_2$]$_2$, B.P. 153–8°/720 mm. Hg, $n_D^{20}$=1.4632; chemical shift −99.9 p.p.m. (trace impurity at −125.9 p.p.m. [(CH$_3$)$_2$N]$_3$P).

*Analysis.*—C$_6$H$_{17}$N$_2$P (148.19): Calc'd percent, C, 48.63; H, 11.57; N, 18.91. Found percent, C, 48.29; H, 11.93; N, 19.63.

*Example 5*

(i-C$_4$H$_9$)$_2$PN(CH$_3$)$_2$: From 43.8 g. (0.3 mole) (CH$_3$)$_2$NPCl$_2$, 43.6 g. (0.22 mole) Al(C$_4$H$_9$-i)$_3$, 150 ml. hexane and 25 g. KCl as described in Example 3. Distillation of the crude distillate (45.9 g.) gives 27 g. (47.8%) (i-C$_4$H$_9$)$_2$PN(CH$_3$)$_2$, B.P. 79–83°/10 mm. Hg, $n_D^{20}$=1.4559 and 9 g. B.P. 128–178°/10 mm. Hg; chem. shift −49.9 p.p.m.

*Analysis.*—C$_{10}$H$_{24}$NP (189.28): Calc'd percent, C, 63.45; H, 12.78; N, 7.40. Found percent, C, 62.74; H, 12.44; N, 7.39.

*Example 6*

(i-C$_4$H$_9$)P[N(CH$_3$)$_2$]$_2$: From 17 g. (0.11 mole) [(CH$_3$)$_2$N]$_2$PCl, 7.9 g. (0.04 mole) Al(C$_4$H$_9$-i)$_3$, 50 ml. hexane and 4.5 g. KCl as described in Example 3. Redistillation of the crude distillate (13.5 g.) gives 10.2 g. (51.7%) (i-C$_4$H$_9$)P[N(CH$_3$)$_2$]$_2$, B.P. 185–91°/720 mm. Hg, $n_D^{20}$=1.4615; chem. shift −92.4 p.p.m. (trace impurity at −49.7 p.p.m. of the product of Example 5).

*Analysis.*—C$_8$H$_{21}$N$_2$P (176.25): Calc'd percent, C, 54.51; H, 12.01; N, 15.90. Found percent, C, 55.19; H, 12.02; N, 14.65.

*Example 7*

(C$_2$H$_5$)$_2$PN(C$_2$H$_5$)$_2$: From 53.2 g. (0.3 mole) Et$_2$NPCl$_2$, 25 g. (0.22 mole) AlEt$_3$, 150 ml. hexane and 25 g. KCl as described in Txample 3. Redistillation of the crude distillate (16.3 g.) gives 11.2 g. (23.3%) (C$_2$H$_5$)$_2$PN(C$_2$H$_5$)$_2$, B.P. 178–83°/723 mm. Hg, $n_D^{20}$=1.4678; chem. shift −61.6 p.p.m. (impurity at +33.3 p.p.m. Et$_3$P).

*Analysis.*—C$_8$H$_{20}$NP (161.23): Calc'd percent, C, 59.59; H, 12.50; N, 8.69. Found percent, C, 59.07; H, 11.86; N, 7.27.

*Example 8*

(CH$_3$)$_2$PN(CH$_3$)(C$_6$H$_5$): From 40 g. (0.19 mole) C$_6$H$_5$(CH$_3$)NPCl$_2$, 10 g. (0.14 mole) Al(CH$_3$)$_3$, 50 ml. hexane and 15 g. KCl as described in Example 3. Redistillation of the crude distillate (26.2 g.) gives 23.1 g. (72.8%) (CH$_3$)$_2$PN(CH$_3$)(C$_6$H$_5$), B.P. 75–8°/2 mm. Hg and 1.7 g. residue; chem. shift −29.8 p.p.m.

*Analysis.*—C$_9$H$_{14}$NP (167.19): Calc'd percent, C, 64.65; H, 8.44; N, 8.38. Found percent, C, 66.53; H, 9.01; N, 9.48.

*Example 9*

(C$_2$H$_5$)$_2$PN(CH$_3$)Ph: From 62.5 g. (0.3 mole) C$_6$H$_5$(CH$_3$)NPCl$_2$, 25 g. (0.22 mole) AlEt$_3$, 100 ml. hexane and 25 g. KCl as described in Example 3. Redistillation of the crude distillate gives 45 g. (76.8%) $(C_2H_5)_2PN(CH_3)Ph$, B.P. 67–73°/0.01 mm. Hg, $n_D^{20}=$ 1.5542; chem. shift –52.1 p.p.m. (coupling const. 14.5 cps., trace impurity at +33.3 p.p.m. $Et_3P$).

*Analysis.*—$C_{11}H_{18}NP$ (195.2): Calc'd percent, C, 67.67; H, 9.29; N, 7.18. Found percent, C, 67.38; H, 7.36; N, 7.25.

Example 10

$(C_6H_5)(CH_3)PNEt_2$: From 21.5 g. (0.1 mole) $C_6H_5(Et_2N)PCl$, 2.9 g. (0.04 mole) $Al(CH_3)_3$, 10 ml. hexane and 4.5 g. KCl as described in Example 3. Redistillation of the crude distillate (25.5 g.) gave 11.6 g. (59.5%) $(C_6H_5)(CH_3)PNEt_2$, B.P. 90–100°/0.2 mm Hg; M.P. 70–74°.

Example 11

To 44 g. of $(CH_3)_2NPCl_2$ (0.3 mole) is slowly added in a nitrogen atmosphere a solution of 55.2 g. of $Al(C_6H_{11})_3$ (0.2 mole) in 150 ml. of hexane. After the addition of the aluminum compound is complete the reaction mixture is refluxed for 1½ hours, then the hexane is distilled off. To the crude reaction product 23 g. of KCl is added, and the product $(CH_3)_2NP(C_6H_{11})_2$ is purified by high vacuum distillation or by other conventional means.

Example 12

To 44 g. of $(CH_3)_2NPCl_2$ (0.3 mole) is slowly added in a nitrogen atmosphere a solution of 51.6 g. of $Al(C_6H_5)_3$ (0.2 mole) in 150 ml. of hexane. After the addition of the aluminum compound is complete the reaction mixture is refluxed for 1½ hours, then the hexane is distilled off. To the crude reaction product 23 g. of KCl is added, and the product $(CH_3)_2NP(C_6H_5)_2$ is purified by high vacuum distillation or by other conventional means, B.P. 123–125°/0.1 mm.

Example 13

To 44 g. of $(CH_3)_2NPCl_2$ (0.3 mole) is slowly added in a nitrogen atmosphere a solution of 60 g. of $Al(C_6H_5.CH_2)_3$ (0.2 mole) in 150 ml. of hexane. After the addition of the aluminum compound is complete the reaction mixture is refluxed for 1½ hours, then the hexane is distilled off. To the crude reaction product 23 g. of KCl is added, and the product $(CH_3)_2NP(C_6H_5.CH_2)_2$ is purified by high vacuum distillation or by other conventional means.

What is claimed is:

1. A process for preparing aminophosphines of the formula $[(R)_2N]_nPR'_{3-n}$ wherein the R groups are selected from the class consisting of alkyl, cycloalkyl, aralkyl, and aryl hydrocarbon having not more than 18 carbon atoms when taken singly and when taken together with the nitrogen atom to which they are attached pyrrolidine, piperidine and morpholine, R' is selected from the class consisting of aliphatic, cycloaliphatic, araliphatic and aryl hydrocarbon having not more than 18 carbon atoms, $n$ is an integer from 1 to 2, comprising reacting an aminohalogeno-compound of the formula $[(R)_2N]_nPX_{3-n}$ wherein R and $n$ are as described hereinabove and X is a halogen atom, with an organoaluminum compound of the formula $R'_mAlX_{3-m}$ wherein R' and X are as defined hereinabove and $m$ is an integer from 1 to 3.

2. A process of claim 1 wherein the reaction is carried out at a temperature in the range of about 0° C. to about 150° C.

3. A process of claim 1 wherein the reaction is carried out in an inert atmosphere.

4. A process of claim 1 wherein the reaction is carried out in an inert organic solvent.

5. A process of claim 1 wherein the R groups are selected from the class consisting of alkyl, cycloalkyl, aralkyl and aryl hydrocarbon having not more than 8 carbon atoms, R' is selected from the class consisting of alkyl, cycloalkyl, aralkyl and aryl hydrocarbon having not more than 8 carbon atoms, $m$ is 3, X is the chlorine atom, the reaction is carried out in an inert organic solvent and in an inert atmosphere, and the reaction is carried out at a temperature in the range of about 0° C. to about 150° C.

6. A process of claim 1 wherein R and R' are alkyl having not more than 8 carbon atoms, $m$ is 3, X is the chlorine atom, the reaction is carried out in an inert organic solvent and an inert atmosphere, and the reaction is carried out at a temperature in the range of about 0° C. to about 150° C.

7. A process of claim 1 wherein one R is alkyl having not more than 8 carbon atoms, the other R is aryl hydrocarbon having not more than 8 carbon atoms, R' is alkyl having not more than 8 carbon atoms, $m$ is 3, X is the chlorine atom, the reaction is carried out in an inert organic solvent and an inert atmosphere, and the reaction is carried out at a temperature in the range of about 0° C. to about 150° C.

No references cited.

ALEX MAZEL, *Primary Examiner.*

JOSE TOVAR, *Assistant Examiner.*